(12) United States Patent  
Koga

(10) Patent No.: US 12,530,092 B2  
(45) Date of Patent: Jan. 20, 2026

(54) MAGNETIC SHEET, MAGNETIC WRITING SYSTEM, DRAWING METHOD, AND ERASING METHOD

(71) Applicant: Zero Lab Co., Ltd., Tokyo (JP)

(72) Inventor: Ritsuo Koga, Tokyo (JP)

(73) Assignee: ZERO LAB CO., LTD., Tokyo (JP)

( * ) Notice: Subject to any disclaimer, the term of this patent is extended or adjusted under 35 U.S.C. 154(b) by 533 days.

(21) Appl. No.: 18/019,276

(22) PCT Filed: Aug. 4, 2020

(86) PCT No.: PCT/JP2020/029803  
§ 371 (c)(1),  
(2) Date: Aug. 9, 2023

(87) PCT Pub. No.: WO2022/029877  
PCT Pub. Date: Feb. 10, 2022

(65) Prior Publication Data  
US 2024/0053833 A1  Feb. 15, 2024

(51) Int. Cl.
| | |
|---|---|
| *G06F 3/0354* | (2013.01) |
| *B32B 5/16* | (2006.01) |
| *B32B 27/14* | (2006.01) |
| *H01F 1/16* | (2006.01) |

(52) U.S. Cl.  
CPC .......... *G06F 3/03545* (2013.01); *B32B 5/16* (2013.01); *B32B 27/14* (2013.01); *H01F 1/16* (2013.01); *B32B 2264/1022* (2020.08); *B32B 2307/208* (2013.01); *B32B 2307/412* (2013.01)

(58) Field of Classification Search  
CPC .......... B32B 2307/412; G06F 3/03545; H01F 1/447; B43L 1/00  
See application file for complete search history.

(56) References Cited

U.S. PATENT DOCUMENTS

2006/0292361 A1* 12/2006 Iwasaki .............. B43L 21/00  
428/323  
2014/0109446 A1   4/2014 Joo et al.  
2015/0277160 A1* 10/2015 Laxton ................ G02F 1/09  
359/296  
2017/0336896 A1* 11/2017 Paolini, Jr. ............ G06F 3/046  
2020/0133089 A1*  4/2020 Mccreary ............. G02F 1/1673

FOREIGN PATENT DOCUMENTS

| CN | 2564361 Y | * | 8/2003 |
|---|---|---|---|
| JP | H04199086 A | | 7/1992 |
| JP | H05341719 A | | 12/1993 |
| JP | 4089808 B2 | | 5/2008 |
| JP | 2015505622 A | | 2/2015 |
| JP | 2019072908 A | | 5/2019 |

* cited by examiner

*Primary Examiner* — James S. McClellan  
(74) *Attorney, Agent, or Firm* — Slater Matsil, LLP

(57) ABSTRACT

A magnetic sheet includes a first sheet, a second sheet, and a number of microcapsules disposed between the first and the second sheets. Each microcapsule contains magnetic particles, clustered magnetic particles, non-magnetic particles, clustered non-magnetic particles, a suspending agent, and a solvent. The magnetic sheet is designed so that the magnetic particles reacting to a rotating magnetic line of force applied from a side of the first sheet rotate and move in a direction opposite to a direction of rotation of the magnetic line of force and aggregate near a center of the microcapsule to stay stationary.

21 Claims, 17 Drawing Sheets

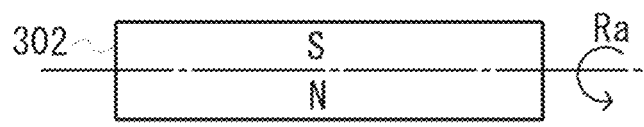
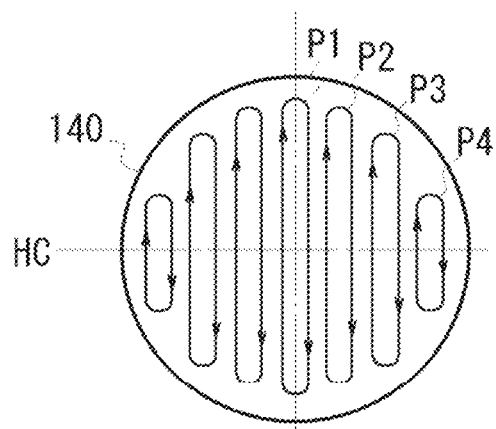
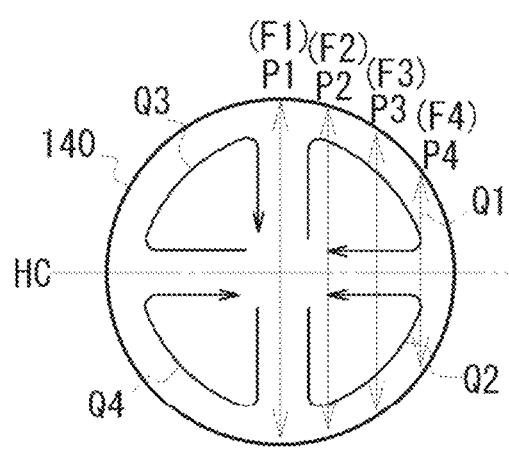
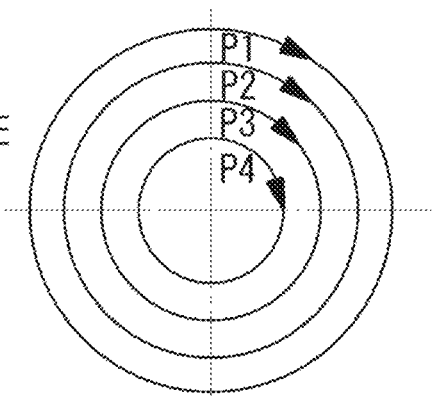
Fig. 6A Fig. 6B
MAGNITUDE OF CENTRIFUGAL FORCE
F1>F2>F3>F4
Fig. 6C

RANEG A

RANGE B (C) STRONG MAGNETIC LINE OF FORCE (D) AT DRAWING WITH WEAK MAGNETIC LINE OF FORCE (A) AT THE TIME OF ERASING (B) WEAK MAGNETIC LINE OF FORCE

MAGNETIC SHEET, MAGNETIC WRITING SYSTEM, DRAWING METHOD, AND ERASING METHOD

CROSS-REFERENCE TO RELATED APPLICATIONS

This application is a PCT National Stage application based on PCT/JP2020/029803, which was filed on Aug. 4, 2020, which application is hereby incorporated herein by reference.

TECHNICAL FIELD

The present disclosure relates to magnetic sheets, magnetic writing systems, drawing methods, and erasing methods.

BACKGROUND

Japanese Patent No. 6179788 discloses a magnetic pen for moving on a magnetic sheet and applying a magnetic field to the magnetic sheet to draw a character, figure, symbol or the like corresponding to a movement locus. Japanese Patent No. 6213886 discloses a magnetic erasing tool for erasing a character, figure, symbol or the like drawn by moving on a magnetic sheet.

With regard to a magnetic sheet, Japanese Patent No. 2850056 discloses a magnetic display in which a microcapsule layer is provided between a non-magnetic substrate and a protective layer, and a large-particle-diameter microcapsule containing magnetic powder and non-magnetic powder and a small-particle-diameter microcapsule containing neither magnetic powder nor non-magnetic powder are arranged in the microcapsule layer. Since the space formed between the particles of the large-particle-diameter microcapsule group is filled with the small-particle-diameter microcapsule group, the microcapsules are filled with high density and the occurrence of pinholes is suppressed.

Further, Japanese Patent No. 4089808 discloses a surface erasable microcapsule magnetophoretic display sheet. The microcapsules contain a dispersion liquid, a white pigment, an additive, and magnetic particles, the average particle diameter of the microcapsules is 50 to 650 μm, and the microcapsules contain two or more kinds of different magnetic particles, thereby enabling full erasure or partial erasure from the recording surface side.

SUMMARY

Embodiments of the present invention relate to a magnetic sheet or panel for drawing arbitrary characters, figures, symbols, etc. under the influence of a magnetic field, and more particularly to the structure of a magnetic sheet having a plurality of microcapsules. Embodiments can address issues in the art.

The magnetic sheet disclosed in Japanese Patent No. 2850056 and Japanese Patent No. 4089808 adjust the diameter of the microcapsule in order to increase the packing density of the microcapsule or to enable erasing from the recording surface side, and such a magnetic sheet is required to further improve the drawing speed at the time of drawing and display characteristics in which afterimages at the time of erasing are suppressed. In addition, a magnetic writing system using such a magnetic sheet also has the problem that it can only handle two-color display of white and black.

Embodiments of the present invention can solve such conventional problems and to provide a magnetic sheet in which display characteristics at the time of drawing or erasing is improved. Another object of the present invention is to provide a magnetic sheet capable of displaying in at least three colors.

A magnetic sheet according to embodiments of the present invention for performing display by an action of lines of magnetic force from a magnetic pen, includes a first seat, a second sheet opposed to the first sheet, and a microcapsule layer formed between the first sheet and the second sheet, the microcapsule layer includes a plurality of microcapsules filled with at least a magnetic substance, a non-magnetic substance, a suspending agent and a solvent, and the plurality of microcapsules include a first microcapsule containing a magnetic substance having at least a first magnetic susceptibility and a second microcapsule containing a magnetic substance having a second magnetic susceptibility larger than the first magnetic susceptibility.

A magnetic system according to embodiments includes the above magnetic sheet, and a magnetic pen for applying lines of magnetic force to the magnetic sheet, the magnetic pen applies magnetic lines of force of different strengths to the magnetic sheet.

A magnetic sheet according to embodiments includes a plurality of microcapsules disposed between a first sheet and a second sheet, each microcapsule contains at least a magnetic substance, a non-magnetic substance, a suspending agent, and a solvent, the magnetic substance which reacts to lines of magnetic force applied from the first sheet side moves to an inner wall surface of the microcapsule on the first sheet side and stays stationary.

A magnetic sheet according to embodiments includes a plurality of microcapsules disposed between a first sheet and a second sheet, each microcapsule contains at least a magnetic substance, a non-magnetic substance, a suspending agent, and a solvent, the magnetic substance reacting to a rotating magnetic line of force applied from the first sheet side rotates and moves in a direction opposite to the direction of rotation of the magnetic line of force, and aggregates and stays stationary near the center of the microcapsule.

A method of drawing on a magnetic sheet according to t embodiments in which a plurality of microcapsules are arranged between a first sheet and a second sheet, and each microcapsule containing at least a magnetic substance, a non-magnetic substance, a suspending agent and a solvent, the magnetic substance which reacts to lines of magnetic force applied from the first sheet side is moved to an inner wall surface of the microcapsule on the first sheet side to be stationary.

A method of erasing to a magnetic sheet according to embodiments in which a plurality of microcapsules are arranged between a first sheet and a second sheet, and each microcapsule containing at least a magnetic substance, a non-magnetic substance, a suspending agent and a solvent, the magnetic substance reacting to a rotating magnetic line of force applied from the first sheet side is rotationally moved in a direction opposite to the direction of rotation of the magnetic line of force, and is stopped near the center of the microcapsule so as to be aggregated.

According to embodiments of the present invention, by using magnetic materials having different magnetic susceptibilities, it is possible to display a plurality of colors when drawing on a magnetic sheet. Further, according to embodiments, since the movement of the magnetic particles or the magnetic material in the microcapsule can be controlled with high precision by the magnetic line of force applied from the outside, the display characteristics of the magnetic sheet at the time of drawing or erasing can be improved as compared with the prior art.

BRIEF DESCRIPTION OF THE DRAWINGS

FIG. 6, which includes FIGS. 6A, 6B, and 6C, is a diagram for explaining a vortex flow and a circulation generated in a microcapsule at the time of erasing according to the present embodiment.

FIG. 12A is a photograph corresponding to the erased state in the range A in FIGS. 5 and 7.

FIG. 12B is a photograph corresponding to the erased state in the range B in FIGS. 5 and 8.

FIG. 12C is a photograph corresponding to the erased state in the range C in FIGS. 5 and 9.

FIG. 12D is a photograph corresponding to the erased state in the range D in FIGS. 5 and 10.

FIG. 13, which includes FIG. 13A is a diagram for explaining the operating state of a microcapsule when a rotating magnetic field line is applied to erase; FIG. 13B is a diagram for explaining the operating state of a microcapsule when a weak magnetic field line is applied to draw; FIG. 13C is a diagram for explaining the operating state of a microcapsule when a strong magnetic field line is applied to draw; and FIG. 13D is a diagram for explaining the preferred operating state of a microcapsule when a weak magnetic field line is applied to draw.

FIG. 14, which includes FIGS. 14A, 14B, 14C, and 4D, is a diagram for explaining a third embodiment of the present invention. FIG. 14A is a diagram for explain the operating state of a microcapsule at the erased state; FIGS. 14B and 14C are diagrams for explaining the operating state of a microcapsule when a weak magnetic field line is applied to draw.

DETAILED DESCRIPTION OF ILLUSTRATIVE EMBODIMENTS

Figure 1A:
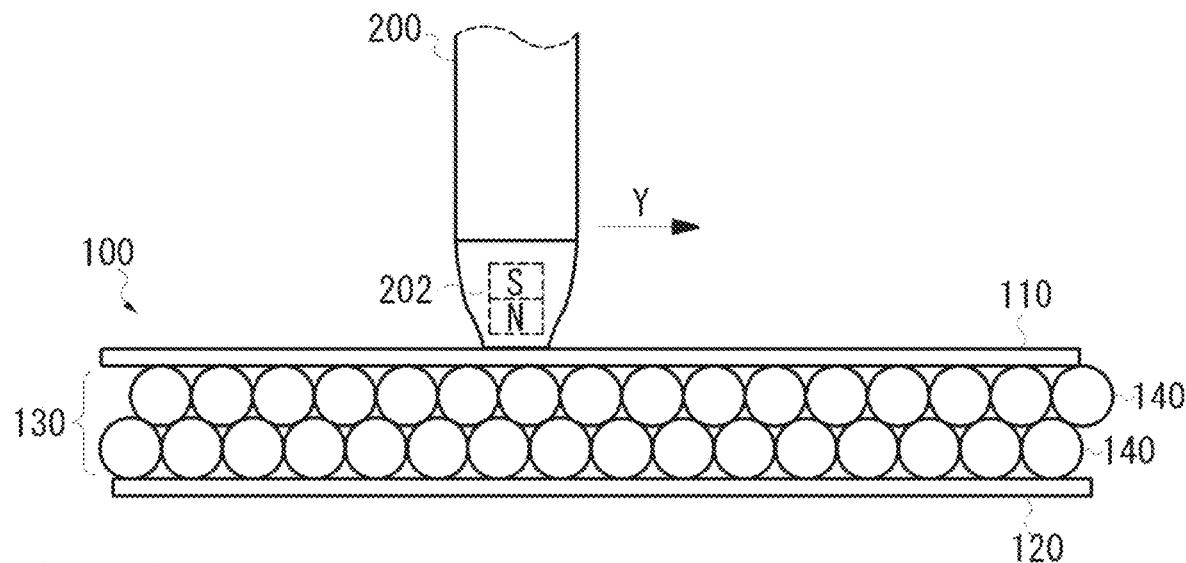
FIG. 1, which includes FIGS. 1A and 1B, schematically illustrates a magnetic sheet according to an embodiment of the present invention.

The magnetic sheet according to embodiments of the present invention displays characters, figures, pictures or the like corresponding to the movement locus by magnetic lines of force or magnetic fields from the magnetic writing instrument when the magnetic writing instrument moves on the drawing surface of the magnetic sheet, and erases the drawn characters or the like when rotating magnetic lines of force or magnetic fields from the magnetic erasing instrument are applied to the drawing surface or back surface of the magnetic sheet. It should be noted that the drawings referred to in the embodiments of the present invention highlight portions to facilitate understanding of the invention and are not necessarily identical to the size or shape of the actual product.

Next, an embodiment of the present invention will be described with reference to the drawings. The planar shape of the magnetic sheet according to the embodiment of the present invention is not particularly limited, but has, for example, a rectangular shape. The rectangular size can be 50 inches or more and can be used as a magnetic display system or magnetic writing system for wall hanging in an office or home. A characteristic point of such a magnetic writing system is that electric power for drawing characters or the like on a magnetic sheet and for holding the drawn characters or the like is practically unnecessary. Further, even in the case of erasing a drawn character or the like, electric power is not necessary, and even if it is necessary, it is very little electric power for changing lines of magnetic force. Further, no erase residue or dust is generated at the time of erasing. Therefore, the magnetic writing system is a device which is very economical and excellent in environment as compared with a writing system using a liquid crystal panel requiring electric power and an electronic blackboard for drawing with a marker.

Figure 1B:
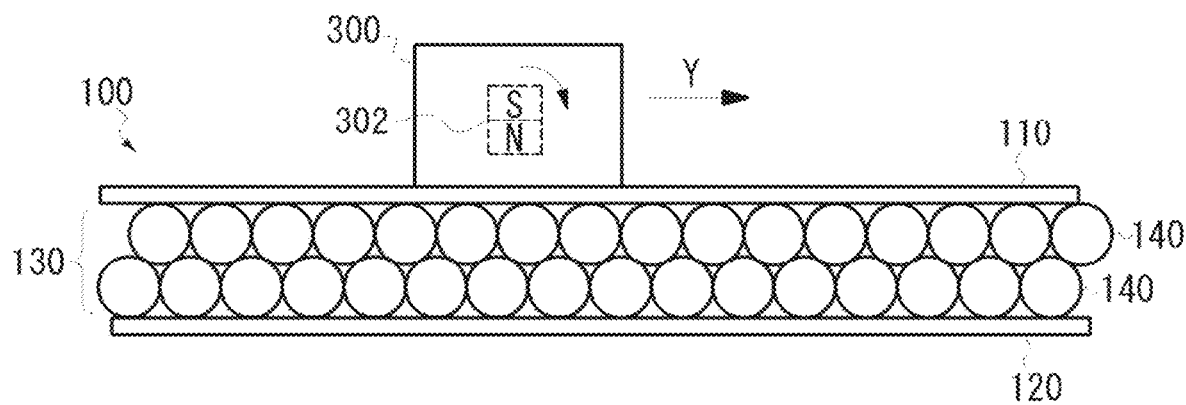

FIGS. 1A and 1B show a schematic cross-section of a magnetic writing system 10 according to an embodiment of the present invention. The magnetic writing system 10 includes a magnetic sheet 100, a magnetic pen 200, and a magnetic eraser 300. When writing a character or the like, the magnetic pen 200 is moved on the magnetic sheet 100, and lines of magnetic force from the magnets 202 included in the magnetic pen 200 are applied to the magnetic sheet 100. When the magnetic pen 200 is moved in the Y direction, a line corresponding to the moving direction is drawn. Further, when the drawn characters or the like are erased, the magnetic eraser 300 is moved on the magnetic sheet 100, and rotated magnetic lines of force from the magnetic eraser 300 are applied to the magnetic sheet 100. The magnetic eraser 300, for example, rotates the magnet 302 and applies magnetic lines of force that rotate while moving in the Y direction to the magnetic sheet 100.

The magnetic sheet 100 comprises an upper support member (sheet) no, a lower support member (sheet) 120, and a microcapsule layer 130 formed between the two support members. The upper support member 110 and the lower support member 120 are, for example formed of a transparent resin sheet. The upper support member 110 provides the drawing surface of the magnetic sheet, the lower support member 120 holds the microcapsules and binder and provides the non-drawing surface of the magnetic sheet, and the upper support no and the lower support 120 are 50 to 150 um thick respectively.

In the microcapsule layer 130, a plurality of microcapsules 140 are arranged, and the thickness of the microcapsule layer 130 is adjusted so that the interval between the upper support member 110 and the lower support member 120 is approximately 300 to 500 um. Microcapsules 140 are generally spherical and have an outer diameter of from 50 to 500 um, preferably from 200 to 300 um.

The microcapsules 140 contain a magnetic substance (e.g., black iron tetraoxide ($Fe_3O_4$) particles), a non-magnetic substance (e.g., white titanium oxide particles), a high boiling solvent, a low boiling solvent, an antifoaming agent, a suspending agent (e.g., finely powdered silicic acid Aerosil having thixotropic properties), and a dispersing agent in the interior. The thixotropic property has a property that viscosity increases once it is stationary.

The blending ratio of the contents contained in the microcapsule 140 is determined so as to satisfy the following characteristics in order to accurately control the movement of the magnetic substance in the microcapsule in response to magnetic lines of force from a magnetic pen or a magnetic eraser.

Figure 2:
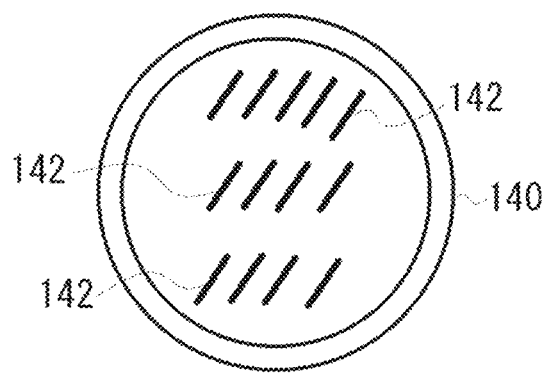
FIG. 2 is a diagram schematically showing the state of the magnetic particles of the microcapsule at the time of drawing according to the present embodiment.

A. When Drawing (1) It is necessary that the line (black magnetic substance) drawn with the magnetic pen remains stationary at the position even after drawing, and that the black magnetic substance is separated from the non-magnetic substance (white titanium oxide particles) as much as possible. FIG. 2 is a schematic view of the microcapsules 140 when viewed from the drawing surface side of the magnetic sheet 100. When drawn with the magnetic pen 200, the magnetic particles 142 are attracted along the lines of magnetic force from the magnetic pen 200 and are stopped. Resting position of the magnetic particles 142 in the height direction is the upper part of the microcapsule 140.

Figure 3:
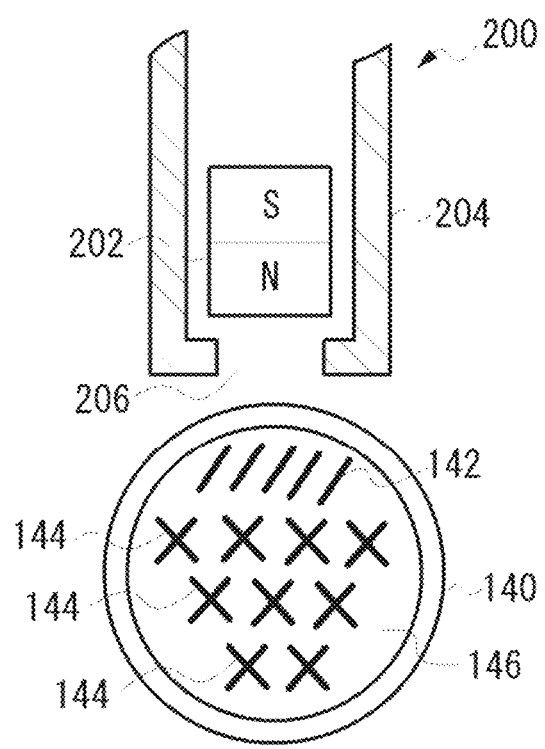
FIG. 3 is a schematic cross-sectional view of a microcapsule at the time of drawing according to the present embodiment.

(2) When drawing with the magnetic pen 200, it is necessary that the magnetic particles 142 can be attracted to the inner wall surface of the microcapsule 140 with relatively weak lines of magnetic force. Attracting the magnetic particles 142 to the inner wall surface can form a sharp drawing line. FIG. 3 is a schematic cross-sectional view showing the state when lines of magnetic force of the magnetic pen 200 are applied to the microcapsules 140. The magnetic pen 200 accommodates a magnet 202 at an end of a housing 204 made of a magnetic material, and a circular opening 206 is formed at the end of the housing 204. The microcapsules 140 are acted upon by controlled magnetic field lines from the magnets 202 through the openings 206. As a result, the magnetic particles 142 are separated from the non-magnetic particles (for example, TiO2) 144, are attracted to the above inner wall surface of the microcapsule 140, and stay still.

(3) It is necessary that the magnetic particles 142 in the microcapsules 140 react (move) sensitively to a relatively weak magnetic field line from the outside. Since the magnetic particles 142 attracted to the inner wall surface of the microcapsule 140 move to the vicinity of the center of the microcapsule 140 and are aggregated and present at the completion of erasure, the magnetic particles 142 react with relatively weak magnetic lines of force and become easily movable.

Figure 4:
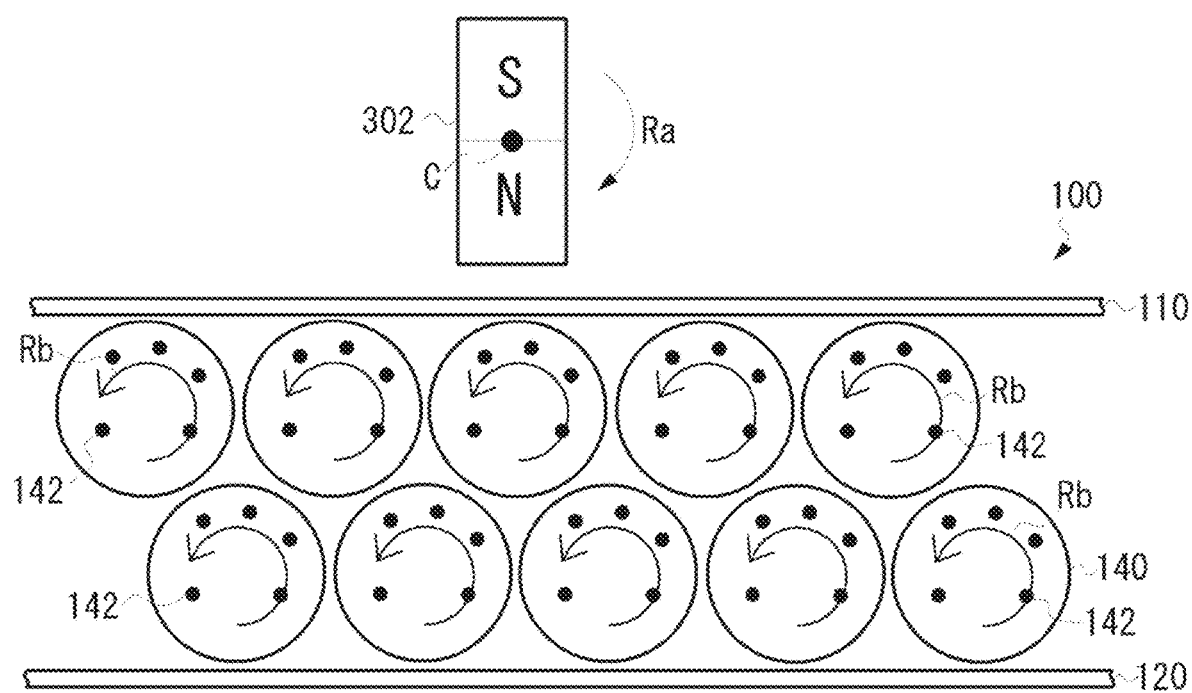
FIG. 4 is a schematic cross-sectional view of the microcapsule at the time of erasing according to the present embodiment.

B. When Erasing (1) When erasing characters or the like drawn by the magnetic eraser 300, it is necessary to apply magnetic lines of force such that the magnetic particles 142 react with externally rotating magnetic lines of force and the magnetic particles 142 rotate and move in the microcapsules 140 in the direction opposite to the rotational direction of the magnetic lines of force. FIG. 4 is a schematic cross-sectional view when a rotating magnetic field line is applied to the microcapsule. When a magnet 302 of the magnetic eraser 300 is rotated in a clockwise direction Ra around a rotation axis C and moved horizontally on the magnetic sheet 100, the magnetic particles 142 in the microcapsule 140 rotate in a counterclockwise direction Rb in response to the rotating lines of magnetic force, a vortex flow is generated in the fluid in the microcapsule 140 by this rotation, and a circular flow toward the center of the microcapsule 140 is generated by an internal pressure difference caused by centrifugal force.

Figure 5:
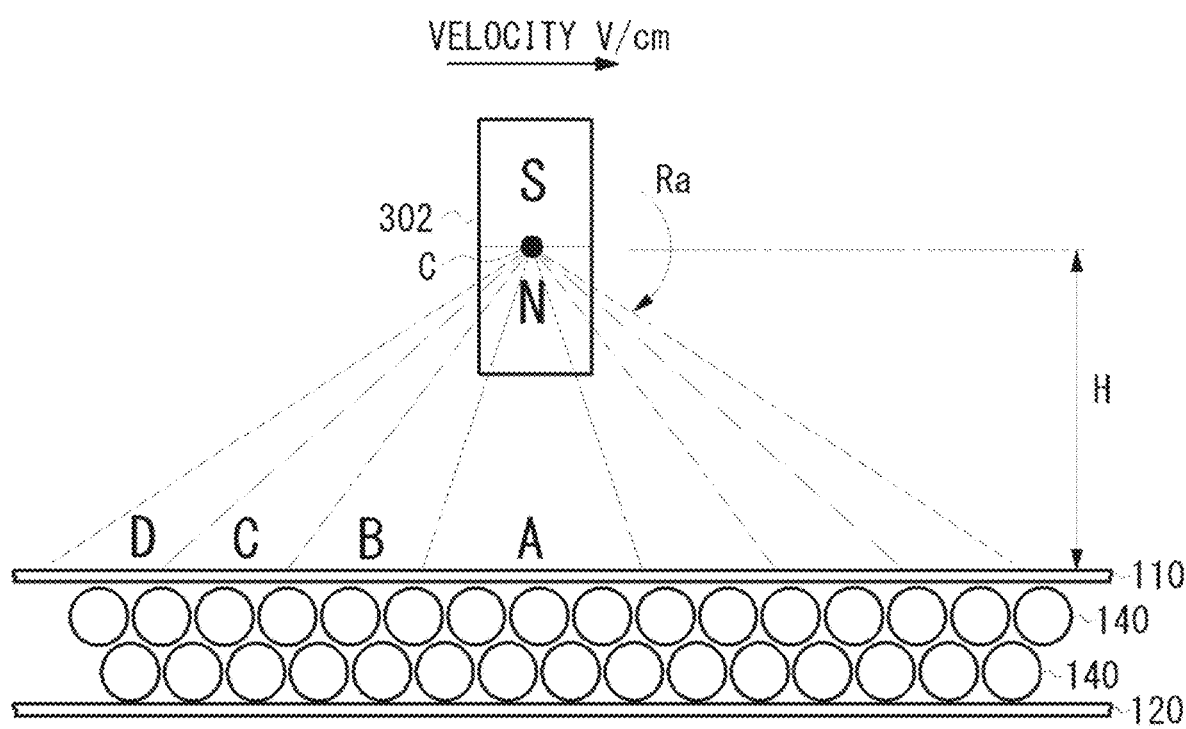
FIG. 5 is a diagram for explaining a change in the intensity of magnetic lines of force acting on the microcapsule at the time of erasing according to the present embodiment.

(2) It is necessary that the strength of the vortex generated by externally rotating magnetic field lines is proportional to the strength of the magnetic field lines. Externally rotating magnetic field lines act in the microcapsules by moving the magnetic eraser 300 in parallel on the drawing surface of the magnetic sheet 100. In this case, the intensity of the line of magnetic force from the magnetic eraser 300 continuously changes to "strong", "medium" and "weak". This state is schematically shown in FIG. 5. As shown in the figure, the magnet 302 of the magnetic eraser 300 moves on the magnetic sheet 100 at a speed V while rotating at a constant rotational speed. The magnet 302 is spaced from the drawing surface of the magnetic sheet 100 by a distance H. The distance H is a size at which the lines of magnetic force from the magnet 302 appropriately act on the magnetic sheet 100. When the magnetic eraser 300 is moved in the horizontal direction, the magnetic field lines act strongly in a range A close to the magnet 302, the magnetic field lines act moderately in a range B distant from the range A, the magnetic field lines act weakly in a range C distant from the range B, and the magnetic field lines hardly act or the magnetic particles are stationary near the center of the microcapsule 140 in a range D further distance from the range C.

(3) In the range A in which the magnetic line of force strongly acts, the drawn magnetic particles are attracted to the inner wall surface of the microcapsule 140 and stay there. When the magnetic particles stop, the viscosity increases due to the thixotropic property of the suspending agent, and the mobility of the magnetic particles decreases due to the residual magnetism of the magnetic particles, so that the stationary position is maintained. In order to erase, it is necessary to apply a large force for releasing the force holding the stationary state of the magnetic particles. In other words, it is necessary to apply strong lines of magnetic force to the magnetic particles in a stationary state to start to rotate the magnetic particles.

When a strong magnetic field is applied, the magnetic particles which are still after drawing are decomposed and start to rotate in the microcapsule 140 as an aggregate of several to several tens of magnetic particles due to a strong vortex flow generated by the rotation of the magnetic particles. The magnetic particles tend to aggregate by strong magnetic lines of force, but are decomposed into a plurality of aggregates by vortex flow generated in the microcapsules. FIG. 6 illustrates the vortices P1, P2, P3 and P4 in the microcapsules 140 when a rotating magnetic field line is applied. FIG. 6A is a diagram schematically showing a vortex flow when a cross section of the microcapsule 140 is viewed from a lateral direction or a horizontal direction, FIG. 6B is a diagram schematically showing a circular flow generated in the cross section of FIG. 6A, and FIG. 6C is a diagram schematically showing a vortex flow when the microcapsule 140 is viewed from a direction different from FIG. 6A by 90 degrees.

As shown in FIG. 6A, the magnetic particles rotate and move in the direction opposite to the rotating magnetic field lines, and this becomes a driving force to generate fluid vortices P1, P2, P3, and P4 in the microcapsules 140. When the magnetic particles rotate about the horizontal axis HC passing through the center of the microcapsule 140, the centrifugal force due to the vortex flow generated in the microcapsule is very weak or does not act on the center side and becomes large on the end side. In other words, the centrifugal forces F1, F2, F3, and F4 due to the vortices P1, P2, P3, and P4 have a relationship of F1>F2>F3>F4. Due to the internal pressure difference of the centrifugal forces F1, F2, F3, and F4 of the vortex flows P1, P2, P3, and P4, as shown in FIG. 6B, circulations Q1, Q2, Q3, and Q4 from the peripheral edge toward the vicinity of the center are generated. Therefore, aggregates of magnetic particles tend to gather at the central portion, and when an appropriate strength of magnetic lines of force and rotational speed are applied, a phenomenon in which magnetic particles gather near the central portion due to a circulating flow becomes remarkable.

Figure 7:
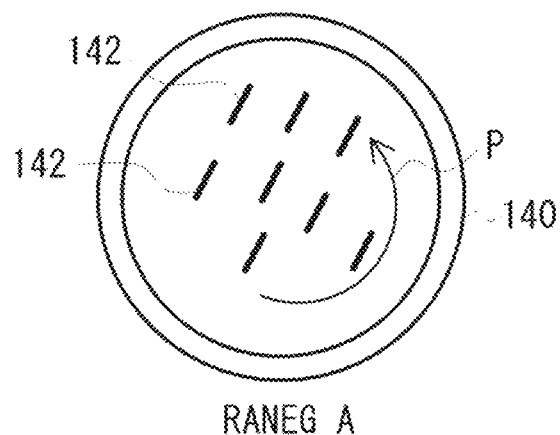
FIG. 7 illustrates the operation of the microcapsules in the range A in which the magnetic field lines strongly act.

The magnetic particles in range A of the stationary state after drawing (FIG. 5) tend to aggregate by the action of the rotating strong magnetic lines of force, but since the force by the vortex flow is strong, the magnetic particles are decomposed into tens of aggregates by the reaction force or friction force of the viscosity of the solvent, and the decomposed plurality of aggregates rotate violently along the vortex flow and the circular flow in the microcapsule. Further, the non-magnetic substance which is not affected by the magnetic field line is dispersed on the inner wall surface of the microcapsule 140 by the centrifugal force of the vortex flow. This state is schematically shown in FIG. 7.

Figure 8:
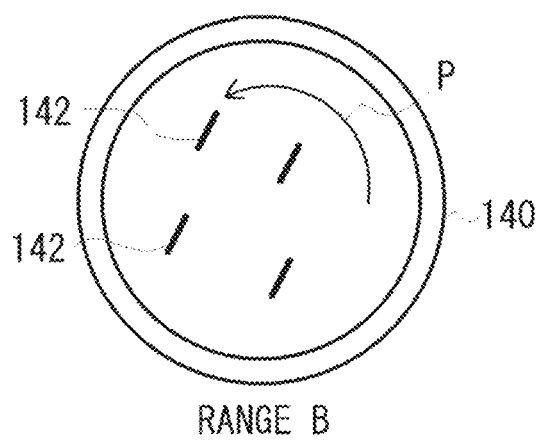
FIG. 8 illustrates the operation of the microcapsules in the range B in which magnetic field lines act moderately.

In the range B in which the magnetic field lines act moderately (FIG. 5), the vortex flow is slow, so that the aggregates decomposed into tens of particles in the range A become large by the action of the magnetic field lines and the number of aggregates decreases, and such aggregates rotate in the microcapsules by the action of the vortex flow and the circular flow toward the center, whereby the separation from the non-magnetic particles contained in the solvent becomes easy and the movement becomes easy. This state is schematically shown in FIG. 8.

Figure 9:
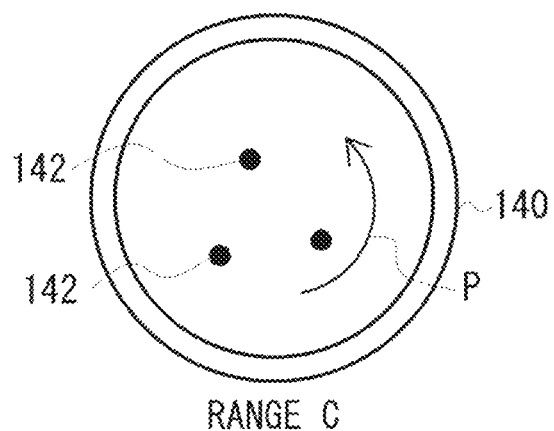
FIG. 9 illustrates the operation of a microcapsule in a range C in which magnetic field lines act weakly.

In the range C in which the magnetic line of force acts weakly (FIG. 5), the aggregate starts to gather at the center due to the circulation toward the center of the microcapsule 140. In the central part of the microcapsule, the vortex flow and the circular flow become weak, and the viscosity increases due to the thixotropic property, so that when the magnetic particles are aggregated in the central part and stop, the magnetic particles are easily held there. This state is schematically shown in FIG. 9.

Figure 10:
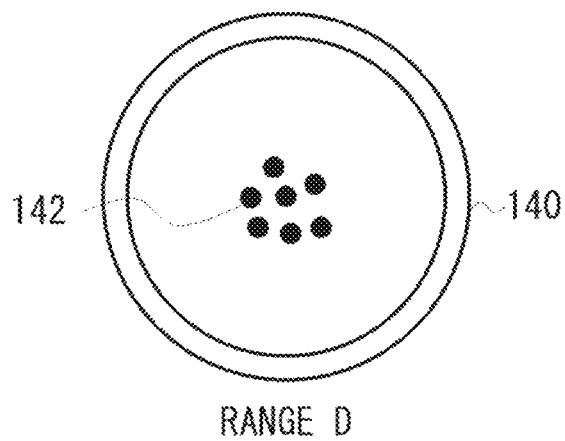
FIG. 10 illustrates the operation of the microcapsules in the range D in which the magnetic field lines do not act.

In the range A to range C, the non-magnetic substance (titanium oxide particles) rotates together with the vortex flow and the circular flow, separates from the magnetic particles, is uniformly distributed on the inner wall of the microcapsule 140, and stays stationary there. In the range D in which the magnetic force does not act, the magnetic particles 142 stay near the center of the microcapsule 140. Further, since residual magnetism acts on the magnetic particles 142, the magnetic particles attract each other, and the stationary state of the magnetic particles 142 near the central portion is promoted. This state is shown in FIG. 10. Thus, the erasure is completed.

The magnetic writing system using the magnetic sheet of the present embodiment has the following features.

The magnetic sheet 100 comprises upper and lower transparent films 110, 120 and the microcapsule layer 130 sandwiched between the upper and lower transparent films, wherein the microcapsule layer 130 comprises a plurality of microcapsules 140 and a binder for binding the microcapsules, and each of the microcapsules 140 is filled with a magnetic substance or magnetic particles that react with external magnetic lines of force. The movement of the magnetic particles in the microcapsules is controlled with high precision in response to magnetic lines of force applied at the time of drawing and erasing.

When such a magnetic sheet is used, drawing is possible from either side of the magnetic sheet, and erasing is also possible from either side of the magnetic sheet. Further, it is possible to maintain black (contrast) after drawing due to an appropriate amount of a suspending agent and a residual magnetic effect, and the change with time is small because the magnetic particles in the microcapsules react continuously/stepwise according to the strength of magnetic field lines. Furthermore, by improving the mobility of the components in the microcapsules, sharp drawing lines can be obtained with a magnetic pen having sharp lines of magnetic force with controlled lines of magnetic force. After the erasure, since the aggregation of the magnetic substance exists in the vicinity of the center of the microcapsule, the magnetic substance reacts to weak lines of magnetic force from any of the upper and lower surfaces of the magnetic sheet.

Titanium oxide particles (white) as a non-magnetic substance are rotated by a vortex flow until near a stationary state, so that they are uniformly distributed on the inner wall of the microcapsule. As a result, since external light is well reflected as a characteristic having a large refractive index (larger than that of diamond), the white color of the magnetic sheet is improved compared with the case of erasing by contacting a stripe-shaped (N/S) magnet from the back surface of the sheet, which is a conventional erasing method.

Due to the unique response characteristics of microcapsules, the condition of externally applied rotating magnetic field lines is determined based on the following factors.

1. Strength of magnetic field lines: If the magnetic field lines are too strong, vortex flows and circulating flows become large, the magnetic particles continue to rotate and cannot aggregate near the center of the microcapsule, resulting in incomplete erasure.
2. Number of revolutions of magnetic field lines: If the number of revolutions of magnetic field lines becomes too high, the magnetic particles cannot respond to the rotating magnetic field lines, cannot rotate and move appropriately, cannot aggregate near the center of the microcapsules, resulting in incomplete erasure.
3. Distance from the magnetic sheet plane: The strength of the magnetic field lines is a function of the distance from the magnetic sheet plane.
4. Moving speed of lines of magnetic force: If the moving speed of the lines of magnetic force is too fast, the magnetic particles cannot respond to the moving speed, cannot behave in the range A to D shown in FIG. 5, resulting in incomplete erasure.

The microcapsules are spherical and the range (vector) in which the microcapsules respond to magnetic field lines is 360 degrees. A circulating flow toward near the central part by the centrifugal force generated by the vortex is generated, and iron tetraoxide is collected in the central part while being aggregated.

The magnetic material in the microcapsules is magnetized in a magnetic field and is condensed along the magnetic field lines. The magnetic material used in this example is ferric oxide, and when the magnetic field is removed, the aggregating force does not act. Therefore, in order to assist the aggregating force, it is preferable to add an appropriate amount of ferrite having permeability and residual magnetic characteristics rather than iron tetraoxide to supplement the aggregating force of iron tetraoxide. Ferrite retains residual magnetism for a short time after the line of magnetic force disappears, and iron tetraoxide is easily aggregated.

Sufficient consideration must be given to the volume ratio of the magnetic substance, the non-magnetic substance, and the solvent in the microcapsule. When a large amount of magnetic substance (black) is contained, it moves to the center of the microcapsule at the time of erasing, but it can be seen through the surface of the microcapsule, so that the brightness of white color is reduced and the microcapsule becomes grayish. In addition, when the magnetic material is small, black at the time of drawing is small, so that the drawing line becomes thin and the contrast is lowered. When the volume ratio of magnetic material and non-magnetic material to the solvent is large, the mobility decreases.

An example of the combination of the materials contained in the microcapsule according to the present embodiment will be shown.

Magnetic material: Ferric oxide particles (black) consist of a combination of small particles of 0.1 to 0.3 um (1.0 to 1.5% by weight) and medium particles of 2 to 3 um (1.0 to 1.5% by weight). Alternatively, magnetic particles (1.0 to 1.5% by weight) clustered to a size of about 1 to 3 um. The clustered magnetic particles are formed by solidifying particles of 0.1 to 0.3 um, for example.

Non-magnetic substance: The titanium oxide (white) powder is particles of 0.2 to 0.3 um (11.0 to 13.0% by weight). Alternatively, non-magnetic particles (11.0 to 13.0% by weight) clustered to a size of about 0.8 to 1.0 um.

High boiling solvent: dibutyl phthalate (38.0 to 41.0% by weight)

Low boiling solvent: triene (40.0 to 44.0% by weight)

Antifoaming agent (appropriate amount)

Precipitation inhibitor: fine powder Aerosil silicate (0.3 to 0.5% by weight)

Dispersing agent (appropriate amount)

The outer diameter of the microcapsules is from 30 um to 1100 um in consideration of the resolution of the magnetic sheet, the difficulty of the manufacturing process and the cost. Further, if necessary, a binder for supporting the microcapsules may be contained between the upper and lower transparent films 110 and 120.

The mobility and separability of the magnetic material and the non-magnetic material are important characteristics for improving contrast and performance in erasing and drawing. By mixing particles of different sizes in the magnetic material, the mobility of the magnetic material is improved and the contrast is also improved.

In order to improve mobility, it is preferable to cluster the magnetic particles. The cluster processing is to make a plurality of magnetic particles spherical to a certain size. Magnetic particles and particles using the magnetic particle are processed into a cluster, a mass of the cluster is mixed in an appropriate amount, and a magnetic particle having improved mobility is used as (black). Since the mass is a spherical mass in which tens of magnetic particles are aggregated, the mobility is improved. A non-magnetic particle and a particle using the non-magnetic particle are processed into a cluster, mixed with the cluster in an appropriate amount, and a non-magnetic particle having improved mobility is used as (white). The cluster is spherical and its size can be controlled. Further, non-magnetic particles are processed into a cluster, and a proper amount of the cluster is mixed to use as non-magnetic particles having improved mobility. By clustering the non-magnetic particles, it becomes difficult for the non-magnetic particles to enter the gap of the stationary magnetic substance attracted to the inner wall of the microcapsule along the magnetic field line at the time of drawing, thereby preventing the contrast of the magnetic particles from decreasing and making the magnetic particles more responsive to the rotating magnetic field line.

Figure 11A:
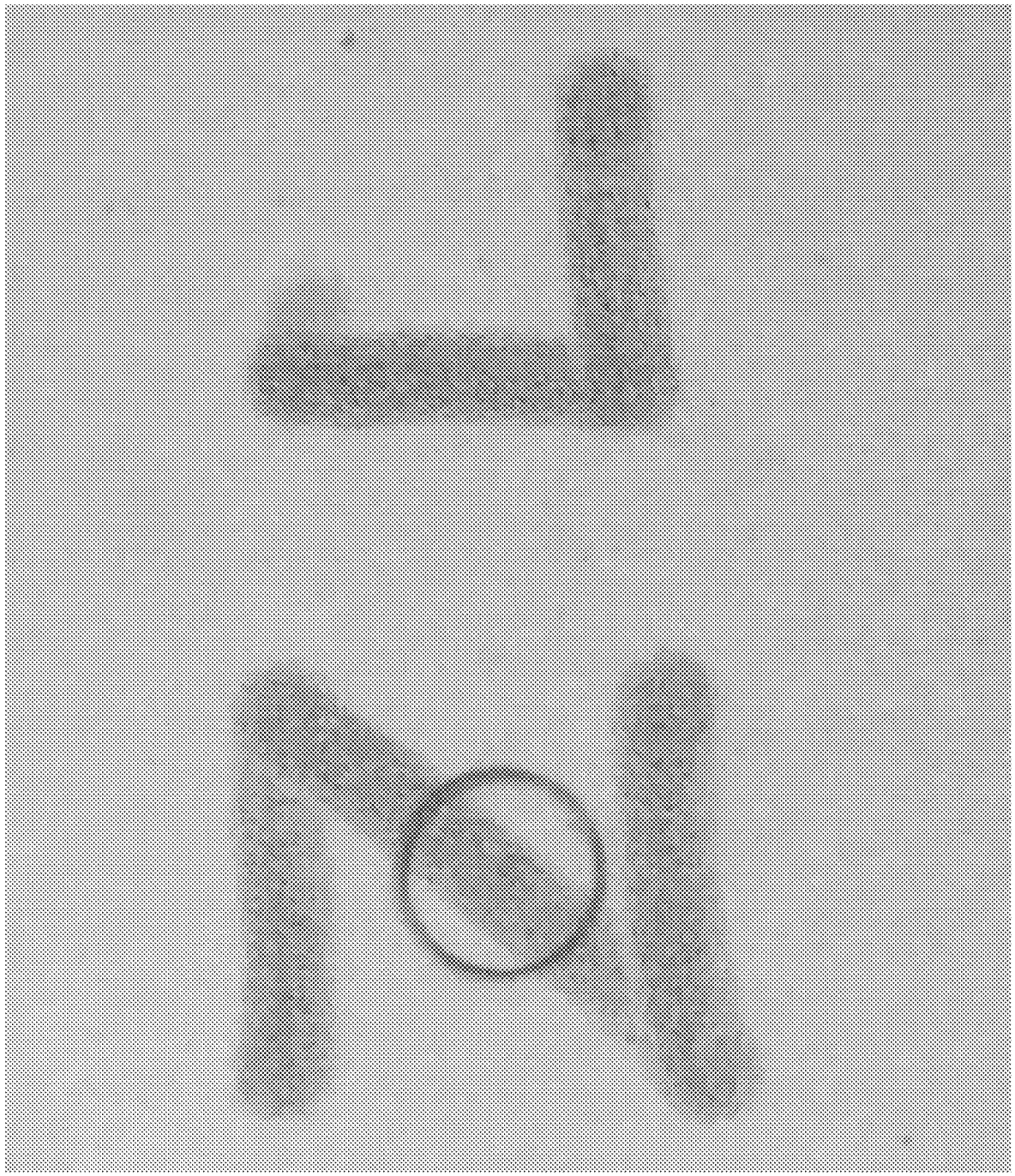
FIG. 11A is a photograph showing an example of a character drawn on a magnetic sheet.
Figure 11B:
FIG. 11B is an enlarged photograph showing the state of the magnetic body after drawing the circle range of FIG. 11A.

FIGS. 11A-12D show photographic observations of magnetic particles in actual microcapsules. FIG. 11A shows an example of a character drawn on a magnetic sheet, in which magnetic particles in the range indicated by circles are observed. FIG. 11B is an enlarged photograph showing the state of the magnetic body in the range of the circle in FIG. 11A after drawing, and it can be seen that the magnetic particles are attracted to the upper side in the microcapsule and stay there.

Figure 12A:
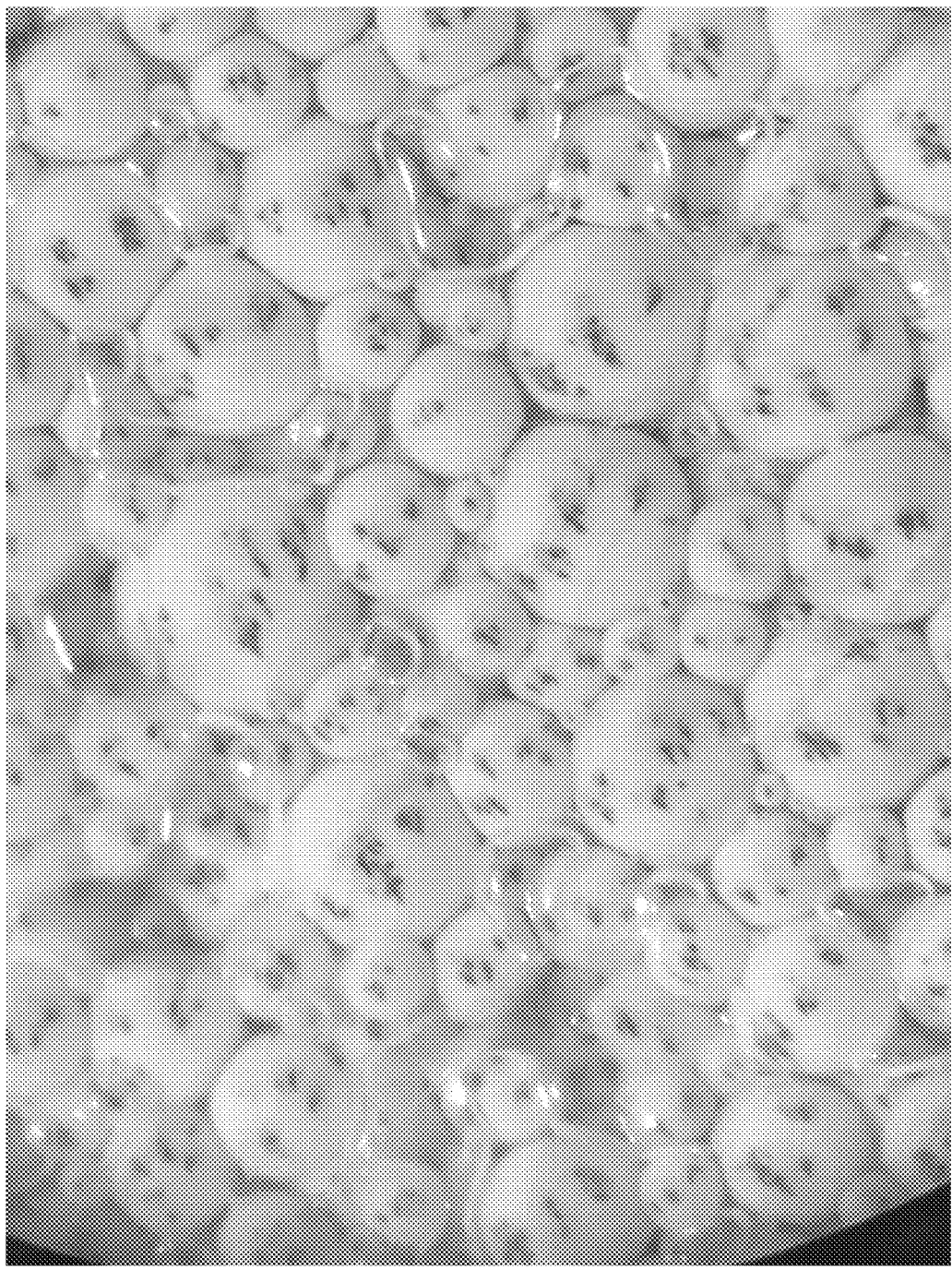
FIG. 12A is an enlarged photograph showing the state of the magnetic body in the range of the circle in FIG. 11A while erasing the magnetic sheet.
Figure 12B:
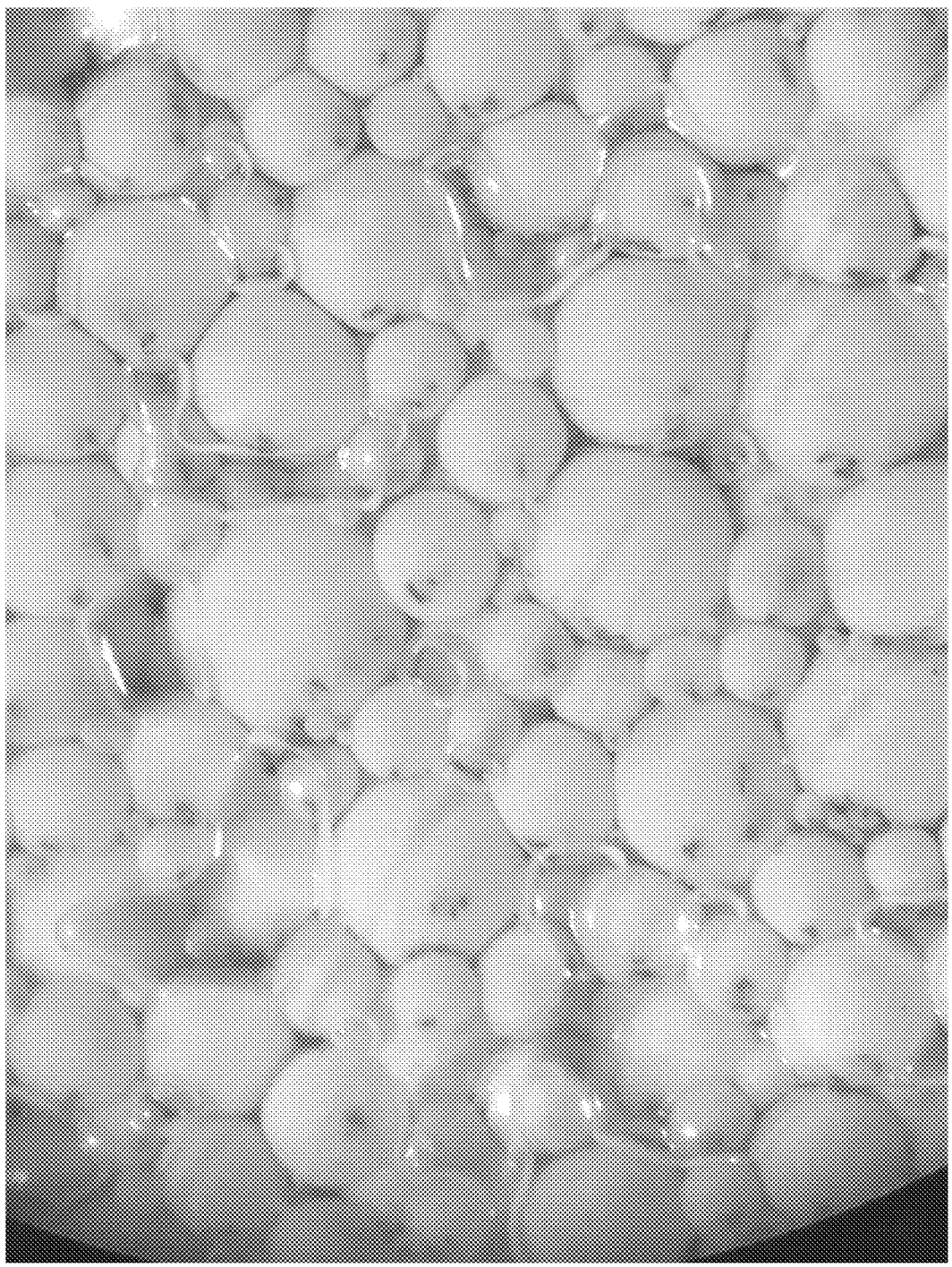
FIG. 12B is an enlarged photograph showing the state of the magnetic body in the range of the circle in FIG. 11A while erasing the magnetic sheet.
Figure 12C:
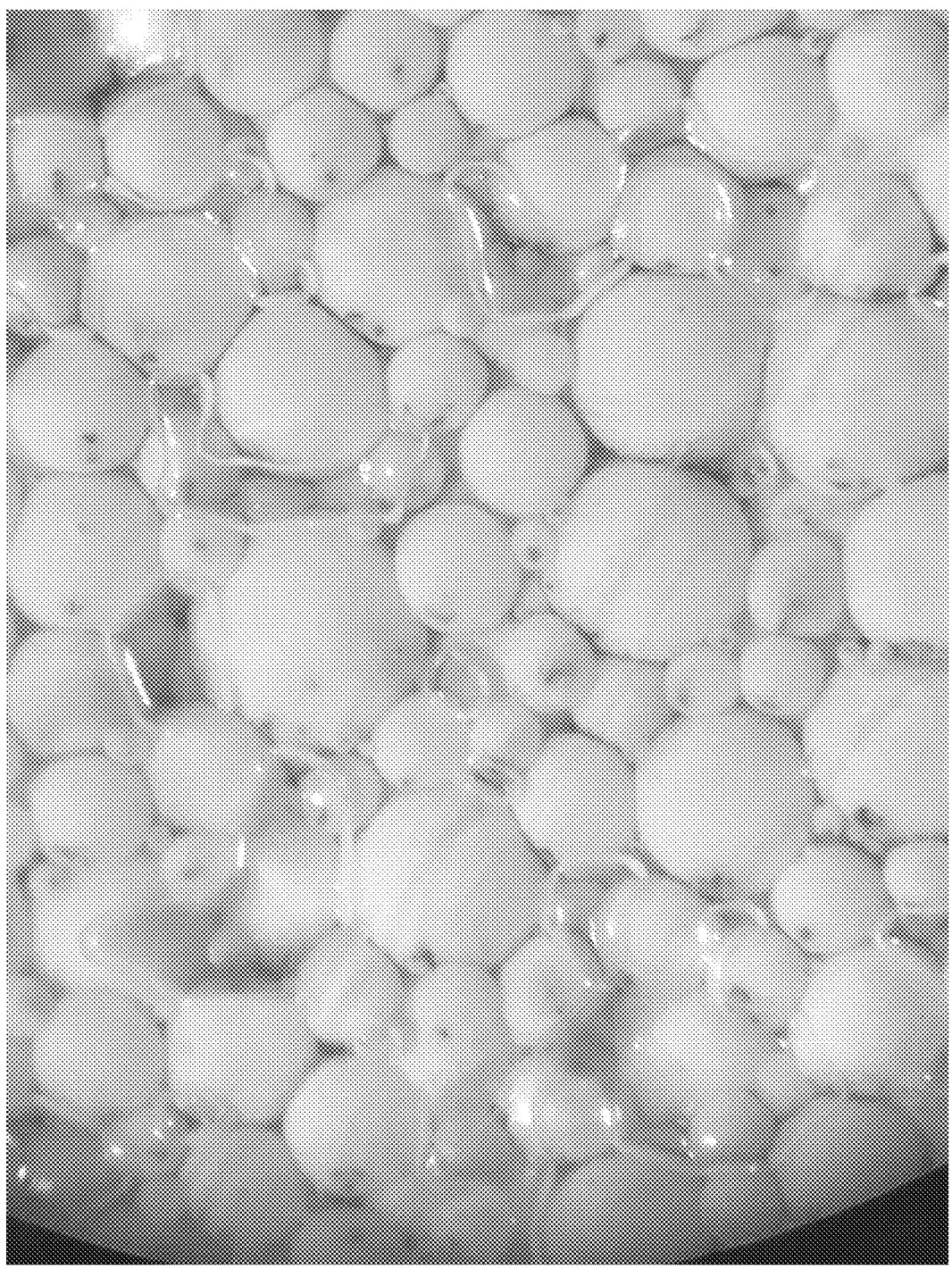
FIG. 12C is an enlarged photograph showing the state of the magnetic body in the range of the circle in FIG. 11A while erasing the magnetic sheet.
Figure 12D:
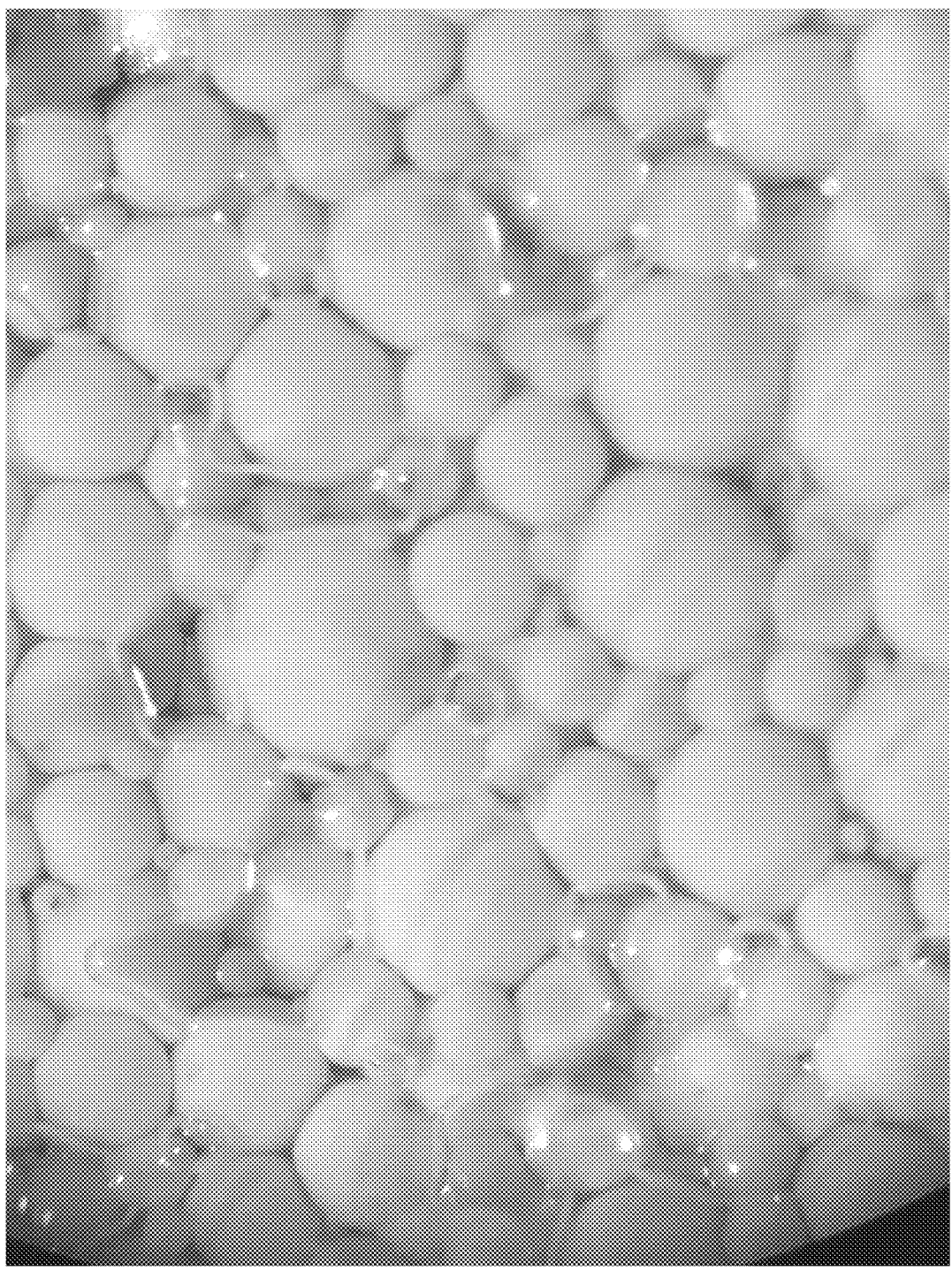
FIG. 12D is an enlarged photograph showing the state of the magnetic body in the range of the circle in FIG. 11A while erasing of the magnetic sheet.

FIG. 12A is an enlarged photograph showing the appearance of the magnetic body in the circle region of FIG. 11A of clumps of rotating magnetic particles during erasing when a rotating magnetic field is applied to the magnetic sheet, which corresponds to the erased state in the region A of FIGS. 5 and 7. FIG. 12B is an enlarged photograph corresponding to the erased state of the range B in FIGS. 5 and 8, FIG. 12C is an enlarged photograph corresponding to the erased state of the range C in FIGS. 5 and 9, and FIG. 12D is an enlarged photograph corresponding to the erased state of the range D in FIGS. 5 and 10. As is apparent from FIGS. 12A to 12D, the magnetic substance enters into the vicinity of the center of the microcapsule as the erasing proceeds, and finally the microcapsule becomes a clean white color, indicating that the erasing has been completed.

Next, a second embodiment of the present invention will be described. The second embodiment relates to a color magnetic sheet capable of drawing three or more colors or colors. The second embodiment has a plurality of kinds of microcapsules filled with colored magnetic materials having different magnetic susceptibilities in order to cope with color drawing. As an example, it will be explained that three colors of white, black or brown, and red are drawn on a magnetic sheet. In this case, two kinds of microcapsules are prepared. The first microcapsule 140A is filled with black magnetic particles having a first magnetic susceptibility, and the second microcapsule 140B is filled with red magnetic particles having a second magnetic susceptibility which is larger than the first magnetic susceptibility. Magnetic susceptibility is a physical property that indicates the susceptibility of a material to magnetization. Since the second magnetic particles have a higher magnetic susceptibility than the first magnetic particles, the second magnetic particles are more easily magnetized than the first magnetic particles. That is, the second magnetic particles are magnetized by a magnetic field or lines of magnetic force having a lower strength than the first magnetic particles and react with such magnetic field.

The average outer diameter of the first microcapsules 140A is adjusted to be larger than the average outer diameter of the second microcapsules 140B, and the number of the first microcapsules 140A is adjusted to be larger than the number of the second microcapsules 140B. The first and second microcapsules 140A and 140B are filled with a non-magnetic substance (for example, white titanium oxide particles), a high-boiling solvent, a low-boiling solvent, an antifoaming agent, a suspending agent, and a dispersing agent as in the first embodiment.

The colored magnetic material is, for example, black magtight ($Fe_3O_4$:ferric oxide) or brown maghemite ($\gamma$—$Fe_2O_3$:magnetic hematite). Further, the colored magnetic material can be colored magnetic glass or a method of coating a magnetic material with a polymer, and the magnetic susceptibility can be varied depending on the thickness of the coating of the magnetic material, the size of particles, or the like. In general, the smaller the particle, the lower the magnetic susceptibility. Further, the magnetic susceptibility can be changed even if the magnetic material is the same. For example, the magnetic susceptibility can be varied by varying the particle size of iron tetraoxide or by varying the thickness of the silicon coating. The larger size particles may be clustered particles. Colored polystyrene, polyethylene or the like can be used as the non-magnetic material.

The magnetic pen has a function of selectively applying weak magnetic field lines or strong magnetic field lines to the magnetic sheet. The strength of the magnetic field line can be changed depending on the distance from the magnet in the magnetic pen to the magnetic sheet and/or the size of the magnet. For example, the magnetic pen may be configured to generate weak magnetic lines of force from one end and strong magnetic lines of force from the other end, or may be configured such that the generation of weak magnetic lines of force and strong magnetic lines of force can be selectively switched by changing the position of a magnet attached to one end. Alternatively, two magnetic pens may be prepared, one of which generates weak magnetic lines of force and the other generates strong magnetic lines of force. For example, Japanese Patent No. 6179788 discloses a magnetic pen capable of changing the intensity of magnetic field lines by changing the distance from a magnetic sheet to a magnet.

Next, a drawing operation in the magnetic writing system of the second embodiment will be described with reference to FIG. 13. For ease of explanation, a state in which the magnetic particle reacts to the magnetic line of force and stays at rest on the inner wall surface of the macro capsule is referred to as "ON", and a state in which the magnetic particle stays at rest at the center is referred to as "OFF".

Figure 13A:
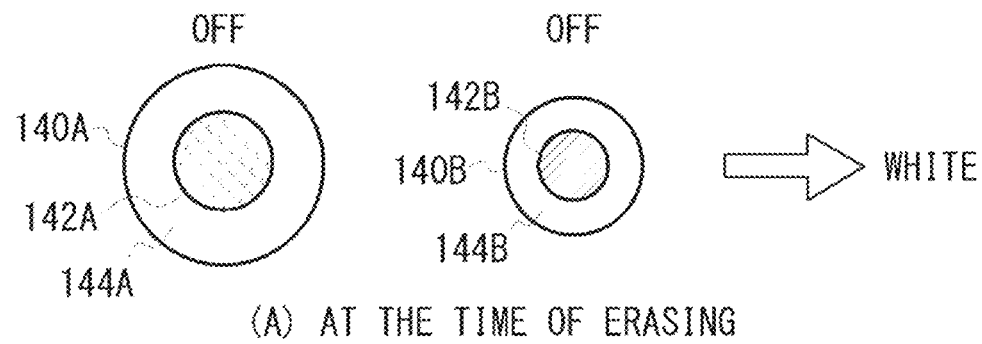
FIGS. 13A, 13B, 13C, and 13D, is a diagram for explaining a second embodiment of the present invention.

FIG. 13A is a schematic side view of the first and second microcapsules 140A and 140B at the time of erasing. When a drawn character or the like is erased, rotating magnetic lines of force from the magnetic eraser are applied to the magnetic sheet. As described in the first embodiment, the first and second magnetic particles 142A, 142B in the first and second microcapsules react with the lines of magnetic force and separate from the non-magnetic particles 144A, 144B, and the first and second magnetic particles 142A, 142B finally aggregate near the center of the first and second microcapsules 140A, 140B and stay there. Since the black first magnetic particles 142A and the red second magnetic particles 142B are surrounded by the white non-magnetic particles 144A and 144B, the drawing surface of the magnetic sheet is white.

Figure 13B:
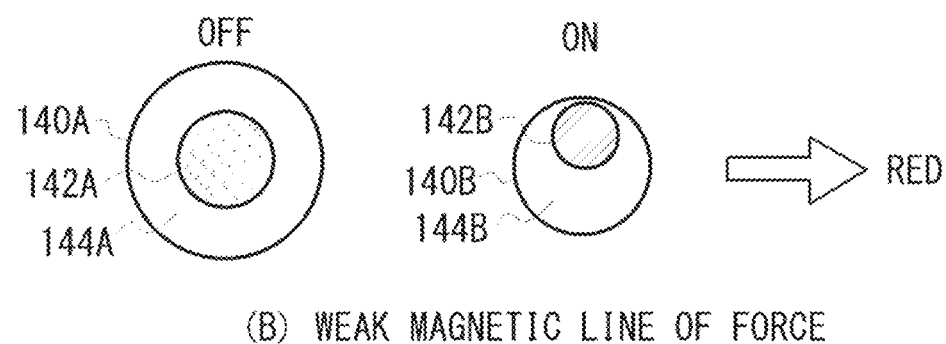

FIG. 13B shows a state of drawing by applying weak lines of magnetic force from the magnetic pen to the magnetic sheet. When weak magnetic lines of force are applied to the first and second microcapsules 140A, 140B in the erased state, the red second magnetic particles 142B of the second microcapsules 140B react with the weak magnetic lines of force, and the second magnetic particles 142B are attracted from the vicinity of the center of the second microcapsules 140B to the upper inner wall surface and stay there. On the other hand, the first magnetic particles 142A do not react with weak lines of magnetic force since their magnetic susceptibility is small and the first magnetic particles 142A stay near the center of the first microcapsules 140A. Therefore, a red color is drawn on the magnetic sheet by weak magnetic field lines. At this time, as shown in FIG. 13D, although the average outer diameter and the number of the second microcapsules 140B are smaller and smaller than those of the first microcapsules 140A, the contrast of the red color is sufficient because the base is white.

Figure 13C:
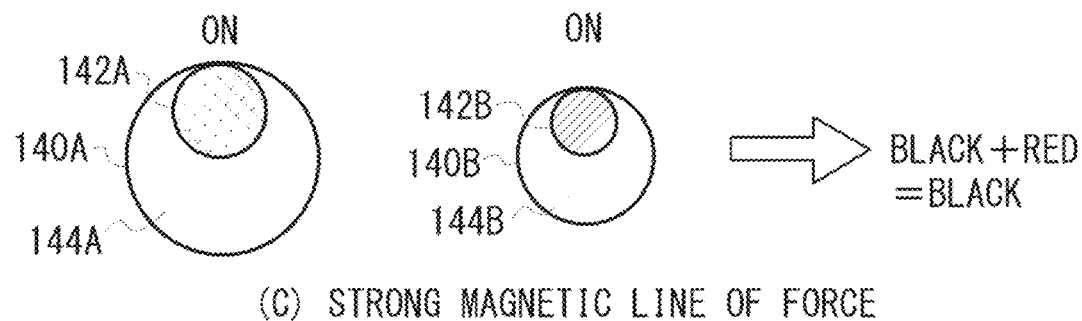
Figure 13D:
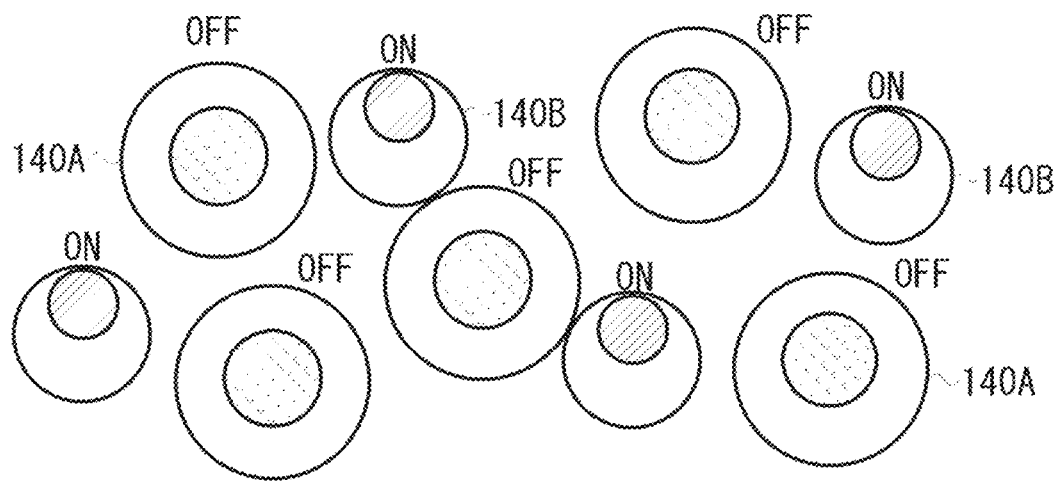

FIG. 13C shows a state when strong lines of magnetic force from the magnetic pen are applied to the magnetic sheet. When a strong magnetic line of force is applied, the black first magnetic particles 142A of the first microcapsules 140A react with it, and the first magnetic particles 142A are attracted from the vicinity of the central portion of the first microcapsules 140A to the upper inner wall surface, and come to rest along the magnetic line of force. The red second magnetic particles 142B of the second microcapsules 140B react similarly, and the second magnetic particles 142B are also attracted to the upper inner wall surface and stay there. In this case, black and red are drawn simultaneously by the black magnetic particles 142A and the red magnetic particles 142B, but since the average outer diameter and the number of the first microcapsules 140A are larger than the average outer diameter and the number of the second microcapsules 140B, black becomes the dominant color, and the black is drawn substantially.

Thus, according to the present embodiment, at least three colors can be displayed by mixing microcapsules of colored magnetic substances (magnetic particles) having different magnetic susceptibilities. In the above embodiments, black and red are exemplified as the colored magnetic material, but this is only an example, and a combination of other colors may be used. For example, it may be a combination of black and green, or a combination of green and yellow.

Further, in the above described embodiments, the example in which microcapsules of two kinds of colored magnetic substances having different magnetic susceptibilities are mixed is described, but this is merely an example, and microcapsules of three or more kinds of colored magnetic substances may be mixed. In this case, although magnetic lines of force having different strengths corresponding to the number of the colored magnetic bodies are applied to the magnetic sheet, since different colored magnetic bodies react simultaneously, it is desirable to adjust color mixing by appropriately selecting the average outer diameter and the number of different kinds of microcapsules.

Next, a third embodiment of the present invention will be described. In the third embodiment, three kinds of microcapsules are prepared, and each of the magnetic particles is colored in three primary colors of cyan (C), magenta (M) and yellow (Y), and the non-magnetic particles are colored in white. The first microcapsule 140A contains cyan magnetic particles 142A having high magnetic susceptibility and white non-magnetic particles 144A, the second microcapsule 140B contains magenta magnetic particles 142B having low magnetic susceptibility and white non-magnetic particles 144B, and the third microcapsule 140C contains yellow magnetic particles 142C having low magnetic susceptibility and white non-magnetic particles 144C.

Figure 14A:
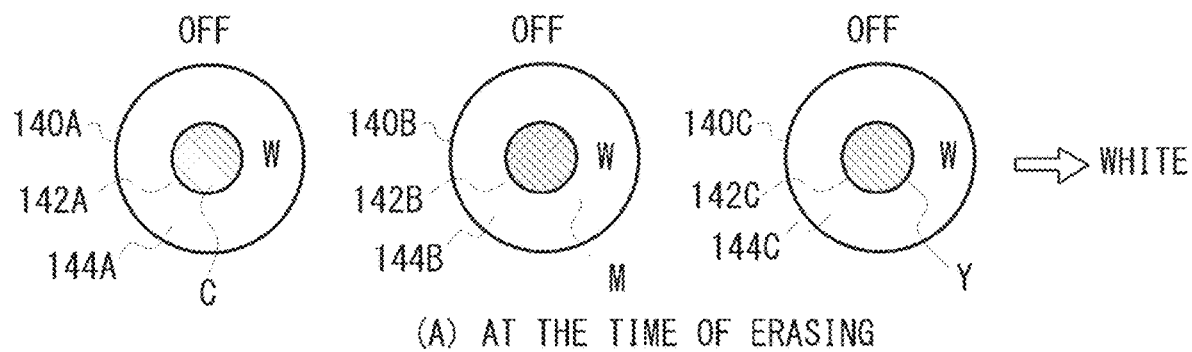

FIG. 14A shows an erased state. In the first to third microcapsules 140A, 140B, 140C, all of the magnetic particles 142A, 142B, 142C are aggregated near the center of the microcapsules in response to the rotating magnetic field lines and are stationary. Since the magnetic particles 142A, 142B, and 142C are surrounded by the white non-magnetic particles 144A, 144B, and 144C, the drawing surface of the magnetic sheet is white.

Figure 14B:
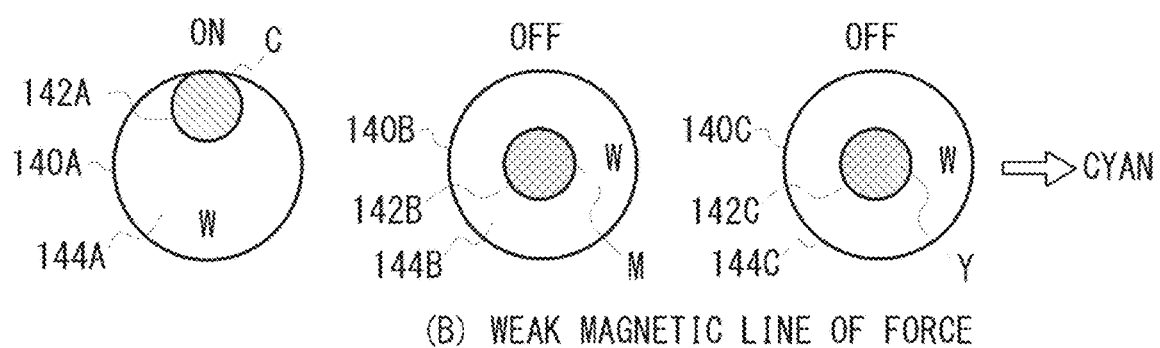

When a weak magnetic field line is applied to the magnetic sheet at the time of drawing, as shown in FIG. 14B, the magnetic particles 142A having high magnetic susceptibility react, and the magnetic particles 142B and 142C having low magnetic susceptibility do not react. Therefore, the magnetic particles 142A are attracted to the upper inner wall surface of the first microcapsule 140A and stay there. As a result, the drawing area to which the weak magnetic field lines are applied becomes cyan of the magnetic particles 142A.

Figure 14C:
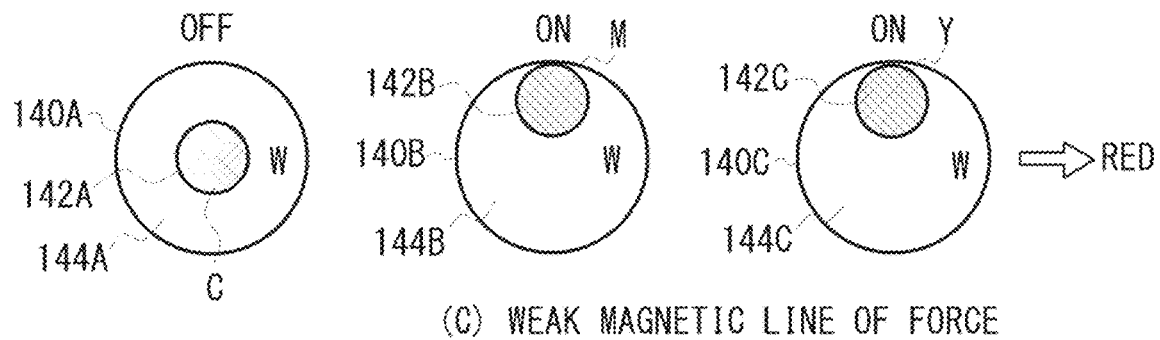

If the second and third microcapsules 140B and 140C contain magnetic particles 142B and 142C having high magnetic susceptibility and the first microcapsules 140A contain magnetic particles 142A having low magnetic susceptibility, as shown in FIG. 14C, the magnetic particles 142B and 142C of the second and third microcapsules 140B and 140C are attracted to the upper inner wall surface, so that the drawing area becomes red, which is a mixture of magenta and yellow.

Figure 14D:
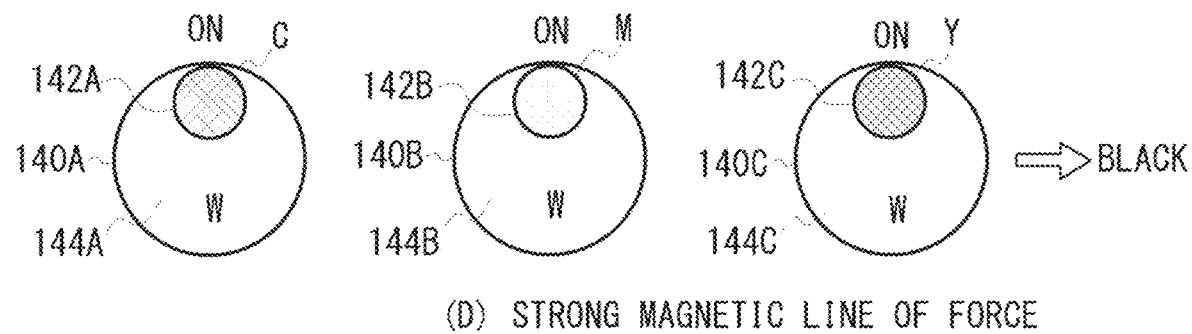
FIG. 14D is a diagram for explaining the operating state of a microcapsule when a strong magnetic field line is applied to draw.

When strong lines of magnetic force are applied to the magnetic sheet, as shown in FIG. 14D, all the magnetic particles 140A, 140B, and 140C of the first to third microcapsules 140A, 140B, and 140C are attracted to the upper inner wall surface and stay there. Accordingly, the drawing area to which the strong magnetic lines of force are applied becomes black, which is a mixture of cyan, magenta and yellow.

As described above, according to this embodiment, by assigning three primary colors of colors to the magnetic particles, it is possible to display drawing on the magnetic sheet in a plurality of colors. However, the above-described combination of colors is merely an example, and other combinations may be used. In addition, the size and number of the outer diameters of different kinds of microcapsules can be appropriately selected according to the color to be displayed. Further, although the three primary colors of the colors are assigned to the magnetic particles in the above-described embodiment, for example, the non-magnetic particles may be composed of a fluorescent material, and the three primary colors of light may be assigned to these particles. For example, by assigning three primary colors of light (R, G, B) respectively to non-magnetic particles and making the magnetic particles black (ferric oxide), white (R+G+B) at the time of rotational erasure, black (all magnetic particles are attracted to the inner wall surface on the upper side of the microcapsule) at the time of drawing by applying strong magnetic lines of force, and when drawing by applying weak magnetic lines of force, color mixing of G+B by turning on the R microcapsule, or color mixing of R+B by turning on the G microcapsule, or color mixing of R+B by turning on the B microcapsule, Also in this case, it is desirable that the number and size of the turned on microcapsules are relatively small so that the color mixture display becomes the dominant color.

Further, in the above embodiment, the magnetic susceptibility of the magnetic material is made to be two levels of strong and weak, but the present invention is not limited to this, and the magnetic material may be made to be different by three or more levels and the magnetic lines of force applied from the magnetic pen may be made to be different by three levels. Thus, the magnetic substance in the microcapsule is attracted to the inner wall surface of the microcapsule in accordance with the strength of the multi-level magnetic field line and stays stationary, and the further display color at the time of drawing can be obtained by utilizing this phenomenon.

Although the preferred embodiments of the present invention have been described in detail above, the present invention is not limited to specific embodiments, and various modifications and changes can be made within the scope of the gist of the present invention described in the claims.

The invention claimed is:

1. A magnetic sheet comprising:
   a first sheet;
   a second sheet; and
   a plurality of microcapsules disposed between the first and the second sheets,
   wherein each microcapsule contains magnetic particles, clustered magnetic particles, non-magnetic particles, clustered non-magnetic particles, a suspending agent, and a solvent; and
   wherein the magnetic sheet is designed so that the magnetic particles reacting to a rotating magnetic line of force applied from a side of the first sheet rotate and move in a direction opposite to a direction of rotation of the magnetic line of force and aggregate near a center of the microcapsule to stay stationary.

2. The magnetic sheet according to claim 1, wherein the magnetic particles are configured to retain a stationary state due to a thixotropic property of the suspending agent.

3. The magnetic sheet according to claim 1, wherein the magnetic particles are attracted to each other by residual magnetism and stay stationary.

4. The magnetic sheet according to claim 1, wherein the magnetic sheet is configured so that a vortex is generated in fluid in the microcapsule by rotational movement of the magnetic particles, the magnetic particles move to the vicinity of the center of the microcapsule by a circulation flow generated by the vortex, and the non-magnetic particles are dispersed around the whole circumference of an inner wall surface of the microcapsule.

5. The magnetic sheet according to claim 1, wherein the plurality of microcapsules contain magnetic particles having different magnetic susceptibilities respectively, and the magnetic particles having different magnetic susceptibilities have different colors from each other and have different colors from the non-magnetic particles.

6. The magnetic sheet according to claim 1, wherein the magnetic particle includes iron tetroxide and ferrite having higher permeability and residual magnetic property than iron tetroxide.

7. The magnetic sheet according to claim 1, wherein the non-magnetic particle includes titanium oxide.

8. A magnetic sheet for performing display by an action of lines of magnetic force from a magnetic pen, the magnetic sheet comprising:
   a first sheet;
   a second sheet opposed to the first sheet; and
   a microcapsule layer formed between the first sheet and the second sheet;

wherein the microcapsule layer comprises a plurality of microcapsules filled with magnetic particles, clustered magnetic particles, non-magnetic particles, clustered non-magnetic particles, a suspending agent and a solvent;

wherein the plurality of microcapsules includes a first microcapsule containing magnetic particles having at least a first magnetic susceptibility and a second microcapsule containing magnetic particles having a second magnetic susceptibility that is larger than the first magnetic susceptibility;

wherein at least part of the magnetic particles include a material having residual magnetic characteristics; and wherein the magnetic particles of the first and second magnetic susceptibilities are rotatable and movable toward near a center of the microcapsule to stay stationary in response to external rotating magnetic field lines.

9. The magnetic sheet according to claim 8, wherein the magnetic particles include a magnetic particle of iron tetroxide and a magnetic particle of ferrite having a residual magnetic time longer than that of iron tetroxide.

10. The magnetic sheet according to claim 9, wherein the magnetic particles of the first and second magnetic susceptibilities have a color of any one of cyan, magenta, and yellow.

11. The magnetic sheet according to claim 8, wherein the magnetic particles of the first and second magnetic susceptibilities have a color of any one of cyan, magenta, and yellow.

12. A magnetic writing system comprising:
the magnetic sheet according to claim 8; and
a magnetic eraser configured to apply rotating magnetic field lines to the magnetic sheet.

13. The magnetic writing system according to claim 12, further comprising a magnetic pen configured to apply magnetic lines of force to the magnetic sheet.

14. The magnetic writing system according to claim 12, wherein the magnetic particles include a magnetic particle of iron tetroxide and a magnetic particle of ferrite having a residual magnetic time longer than that of iron tetroxide.

15. A method for use with a magnetic sheet that includes a plurality of microcapsules arranged between a first sheet and a second sheet, each microcapsule containing a magnetic substance, a non-magnetic substance, a suspending agent and a solvent, the method comprising:
applying a rotating magnetic line of force from a side of the first sheet so that the magnetic substance reacts to the rotating magnetic line of force and is rotationally moved in a direction opposite to the direction of rotation of the magnetic line of force and is stopped near a center of the microcapsule so as to be aggregated.

16. The method according to claim 15, further comprising applying a rotating magnetic line of force from a second sheet side, wherein the magnetic substance reacting to the rotating magnetic line of force applied from the second sheet side is rotationally moved in a direction opposite to the rotational direction of the magnetic line of force and is stopped near the center of the microcapsule so as to be aggregated.

17. The method according to claim 15, wherein a vortex is generated in fluid in the microcapsule by rotational movement of the magnetic substance, wherein the magnetic substance moves to the vicinity of the center of the microcapsule by a circulation flow generated by the vortex, and wherein the non-magnetic substance is dispersed around the whole circumference of an inner wall surface of the microcapsule.

18. The method according to claim 15, wherein the magnetic substance retains a stationary state due to a thixotropic property of the suspending agent.

19. The method according to claim 15, wherein the magnetic substance includes magnetic particles attracted to each other by residual magnetism and stay stationary.

20. The method according to claim 15, wherein the magnetic substance includes iron tetroxide and ferrite having higher permeability and residual magnetic property than iron tetroxide.

21. The method according to claim 15, wherein the non-magnetic substance includes titanium oxide.

* * * * *